J. B. ENTZ.
CLUTCH.
APPLICATION FILED AUG. 11, 1905.
1,075,412.
Patented Oct. 14, 1913.
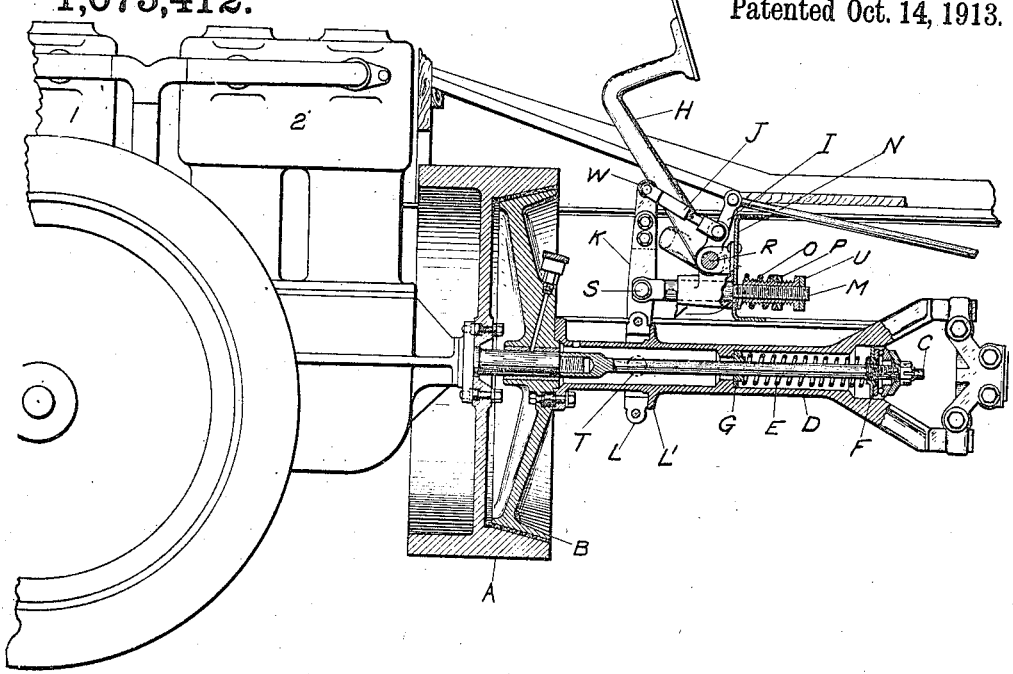

UNITED STATES PATENT OFFICE.

JUSTUS B. ENTZ, OF PHILADELPHIA, PENNSYLVANIA.

CLUTCH.

1,075,412.  Specification of Letters Patent.  Patented Oct. 14, 1913.

Application filed August 11, 1905. Serial No. 273,745.

*To all whom it may concern:*

Be it known that I, JUSTUS B. ENTZ, a citizen of the United States, residing at Philadelphia, in the county of Philadelphia and State of Pennsylvania, have invented certain new and useful Improvements in Clutches; and I do hereby declare the following to be a full, clear, and exact description of the invention, such as will enable others skilled in the art to which it appertains to make and use the same.

My invention relates to new and useful improvements in clutches employed to connect a driving member to a driven member, and applies to various forms of the type known as friction clutches, and is not alone suitable for the form illustrated, which is that generally known as the cone clutch, and more particularly relates to the control of the pressure existing between the friction surfaces.

In clutch mechanisms of the class described, it is customary to apply the pressure between the friction surfaces by means of direct action of a spring on one of the surfaces, and the action of this spring is temporarily counteracted during the disengagement of the clutch members by a lever or a system of levers. In this arrangement as ordinarily constructed, when it is desired to bring clutch members into engagement the pressure on the hand lever or foot lever is released as gradually as possible and the movable member of the clutch is brought into engagement with the non-movable member, and the full pressure of the spring is then exerted. It is easily seen that there is a point in the movement of the lever or system of levers on one side of which the tension of the spring is entirely absorbed by the levers, and on the other side of which it is entirely absorbed by the pressure between the friction surfaces; that is, it is impossible with the constructions used to graduate the application of the spring pressure.

It is the object of the present invention to avoid the disadvantage above described, resulting from the practically instantaneous application of the full power of the spring, and to this end the invention contemplates the introduction of means counterbalancing this spring tension, by which means the power of the spring is fully or partially absorbed at the will of the operator and the parts are so arranged that the application of the pressure between the friction surfaces is very gradual, ranging from zero to the full power of the spring, and so permit a gradual acceleration of speed of the driven member until the maximum or speed of the driving member is reached.

The invention consists in the improved construction of the various elements and their arrangement in operative combination to be fully described hereinafter, the novelty of which will be particularly pointed out and distinctly claimed.

The accompanying drawing represents a view in elevation, part section, of the application of my invention to a motor vehicle clutch mechanism.

A and B are the driving and driven members respectively of the clutch, A being longitudinally immovable, while B is movable along the shaft C so that it may be brought into or out of contact with A as desired by means of the mechanism hereinafter described. Power is supplied to A from the motor 1, 2. The shaft C is rigidly attached to the member A and rotates with it at all times, while the hollow shaft D is rigidly attached to the member B and rotates with it. The member B is normally held in contact with A by means of the spring E acting against the collar F on the shaft C and the shoulder G on the hollow shaft D. A and B are separated by means of the lever H pivoted at R, acting through the arm I and the link J upon the floating lever K, which is connected to the movable shaft D in any of the well-known methods of construction, such as the loose ring L pivoted at T, and the shoulder L' of the shaft D.

N is a rigid member immovable with respect to the other parts of the mechanism, against which one end of the spring O abuts, the other end being held by the collar P adjustable by means of threaded members U on the rod M, which passes through the spring O and the member N, and forms at its end S a fulcrum for the floating lever K. It will be noted there is a shoulder V on the rod M which acts as a stop against the rigid member N, as will be more fully described.

The tension of the springs E and O may be regulated by means of the nuts and collars as shown, to bring about any desired relation between the two springs.

It will be noted that the longitudinal movement of the member B, or of the point T, (which is approximately the point of connection of the lever K with the shaft D,) along the shaft C, between the positions of no contact between A and B and full contact, that is, where the whole pressure of the spring E is applied, is very small, and in constructions previously used with a rigid system of levers it has been impossible to graduate the application of the pressure of the spring E when the clutch was to be put in action; that is, when the surfaces A and B come first into contact there is no pressure exerted between the friction surfaces, and the next small movement of the lever K releases the pressure between the collar L and the shoulder L' and immediately without any gradation the full pressure of the spring E is applied to the friction surfaces and the driven member B must change suddenly from its initial velocity of rotation to that of the driving member A. With the improvements embodied in my invention, however, it is possible to gradually apply the pressure of the spring E to the friction surfaces after they have come into first contact, so that the acceleration of the member B is very gradual from its initial velocity until it attains the velocity of the driving member A. The manner in which this gradual application of pressure is obtained will be clearly understood by reference to the drawings as follows:—Referring to the figure the parts are shown in the relation of nearly full engagement of the clutch members A and B—in full engagement there would be a slight clearance between L and L'—the spring E is exerting nearly its full force while the spring O is out of action owing to the shoulder V acting as a stop against the rigid member N. To release the clutch members power is applied to the lever H which acting through the arm I and the link J applies the power to the lever K at the point W. Just at this instant lever K is fulcrumed at the point T so there is no power applied to overcome the force of the spring E, but as the power applied to H is increased the movement of the rod M through its connection at S to the lever K gradually compresses the spring O to such a point that S becomes the fulcrum of the lever K although not necessarily a fixed fulcrum, and at this instant the point T begins to move and the spring E is correspondingly compressed at the same time that the members A and B are disengaged. But it will be seen that through this movement the power of the spring E is not suddenly overcome as the fulcrum S will continue to move for some time after the beginning of the compression of spring E according to the relative adjustments of the two springs E and O and during this movement of the point S the act of compressing the spring O is working against the compression of the spring E and therefore relieving the pressure between the friction surfaces of A and B very gradually. In the application of the clutch the reverse movements take place as follows:—Upon a slight diminution of the power applied to H the spring E expands until the friction surfaces A and B are just in contact, the point S in the meantime moving slowly to the right. At this instant the spring E is tending to force the friction surfaces into engagement which would mean a movement of the point T to the left, while the spring O acting through the rod M and its connection S is tending to move the point T to the right, the point S being in this case the movable fulcrum so that it is seen that the spring O is counteracting the effect of the spring E and this counteraction continues with the gradual release of pressure on the lever H until the shoulder V comes into contact with the fixed rigid member N and acts as a stop whereupon S becomes the immovable fulcrum and then the full power of the spring E may be applied. It will thus be seen that the member B is held in a floating position, that is, balanced by the opposed equal pressure of the springs E and O, whether through levers or more or less direct, while an appreciable movement of the abutment of spring O is necessary to reduce, and does gradually reduce the pressure tending to keep the friction member B out of engagement. In this manner the surface of B at the moment of contact with the friction surface of A is in that position "floating" and the pressure between the surfaces increases from zero to the maximum, which is predetermined by the adjustment of spring E, the increase varying as the tension is relieved on the spring O by an appreciable movement of the operating lever H operated by the pedal.

It will be seen that by properly proportioning the springs O and E and by means of the adjustments afforded by the threaded members it will be possible to secure any desired relation between these springs and so absolutely control the gradation of the application of pressure between the friction surfaces of A and B, and it is in this gradual application of pressure between the friction surfaces and the control of the same that my invention lies.

While I have illustrated a specific arrangement of parts and the method of carrying out my invention, it is of course understood that the application of the improvement would not be limited to the precise form shown and described but is applicable generally to that class of clutches known as "friction clutches."

What I claim is:—

1. In a friction clutch, the friction surfaces, one being movable into and out of frictional engagement with the other, a spring to apply pressure between the frictional surfaces, a lever to move one of said frictional surfaces away from the other against the pressure of said spring, a floating fulcrum for said lever and a spring tending to move said fulcrum against the pressure of said first mentioned spring, a pedal and connections adapted to operate the outer end of said lever, substantially as shown and described.

2. In a friction clutch, the friction surfaces one being movable into and out of engagement with the other, a lever to move one of said surfaces out of engagement, a pedal and link connection to the end of said lever, a floating spring pressed fulcrum intermediate the ends of said lever, and a spring opposing the motion of the opposite end of said lever and tending to force the movable clutch member to bring the frictional surfaces into engagement.

JUSTUS B. ENTZ.

In the presence of—
E. I. KIRWAN,
RUDOLPH RUGE.